United States Patent
Sawano et al.

(10) Patent No.: US 9,712,091 B2
(45) Date of Patent: Jul. 18, 2017

(54) POWER TOOL AND CONTROLLER

(71) Applicant: Panasonic Intellectual Property Management Co., Ltd., Osaka (JP)

(72) Inventors: Fumiaki Sawano, Mie (JP); Masaaki Okada, Mie (JP); Hidekazu Yuasa, Shiga (JP); Norio Sawada, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/954,315

(22) Filed: Nov. 30, 2015

(65) Prior Publication Data
US 2016/0173015 A1 Jun. 16, 2016

(30) Foreign Application Priority Data
Dec. 12, 2014 (JP) ................. 2014-251774

(51) Int. Cl.
*H02P 1/00* (2006.01)
*H02P 3/00* (2006.01)
(Continued)

(52) U.S. Cl.
CPC ............... *H02P 6/22* (2013.01); *B25F 5/00* (2013.01); *H02P 6/003* (2013.01)

(58) Field of Classification Search
CPC ....... B25B 21/02; B25B 21/00; B25B 21/026; B25B 23/147; B25B 23/1475;
(Continued)

(56) References Cited

U.S. PATENT DOCUMENTS 6,536,536 B1 3/2003 Gass et al.
8,674,640 B2 * 3/2014 Suda ................. B25B 21/00
173/176

(Continued)

FOREIGN PATENT DOCUMENTS

JP    2012-76179 A    4/2012
WO   2013/136711 A2   9/2013

OTHER PUBLICATIONS

Extended European Search Report dated Apr. 11, 2016, issued in European Patent Application No. 15196429.3.

*Primary Examiner* — Paul Ip
(74) *Attorney, Agent, or Firm* — McDermott Will & Emery LLP

(57) ABSTRACT

A power tool includes a motor, a drive unit driven by the motor, and a trigger switch and a forward-reverse switch each operable by a user. The trigger switch is switchable between an activation state and a deactivation state. The forward-reverse switch switches a motor rotation between forward and reverse. The power tool also includes a control unit that drives the motor based on operation of the trigger switch and allows switching of an operation mode of the power tool between first and second modes. In the first mode, the motor rotation is switched to that selected by the forward-reverse switch. In the second mode, when the activation state is switched to the deactivation state, the motor rotation is switched so that the motor is driven in a direction opposite to the present rotation direction when the trigger switch is activated next.

7 Claims, 3 Drawing Sheets

(51) Int. Cl.
*B25F 5/00* (2006.01)
*H02P 6/22* (2006.01)
*H02P 6/00* (2016.01)

(58) Field of Classification Search
CPC .. B25B 23/14; B25F 5/00; B25F 5/021; B25F 5/001; B25F 5/02; B25D 16/006; B25D 16/003; B25D 2216/0023; B25D 2216/0038
USPC ............. 318/17, 446, 400.12; 388/935, 937; 173/93
See application file for complete search history.

(56) References Cited

U.S. PATENT DOCUMENTS

| | | | | | |
|---|---|---|---|---|---|
| 8,919,456 | B2* | 12/2014 | Ng | ........................ | B25B 23/147 173/11 |
| 8,981,680 | B2* | 3/2015 | Suda | ........................ | B25F 5/00 315/314 |
| 9,302,376 | B2* | 4/2016 | Agehara | ................. | B25B 21/02 |
| 9,314,908 | B2* | 4/2016 | Tanimoto | ................ | B25B 21/02 |
| 9,522,461 | B2* | 12/2016 | Oomori | ................... | B25B 21/00 |
| 2012/0169256 | A1* | 7/2012 | Suda | ........................ | B25B 21/00 318/17 |
| 2012/0199372 | A1* | 8/2012 | Nishikawa | ........... | B25B 23/1475 173/132 |
| 2012/0279736 | A1* | 11/2012 | Tanimoto | ................ | B25B 21/02 173/2 |
| 2013/0008679 | A1* | 1/2013 | Nishikawa | ........... | B25B 23/1475 173/93 |
| 2013/0014967 | A1* | 1/2013 | Ito | .............................. | B25F 5/00 173/93 |
| 2013/0087355 | A1* | 4/2013 | Oomori | ................... | B25B 21/00 173/47 |
| 2013/0105187 | A1* | 5/2013 | Agehara | ................. | B25B 21/02 173/20 |
| 2013/0126202 | A1* | 5/2013 | Oomori | ................... | B25B 21/02 173/217 |
| 2013/0292147 | A1* | 11/2013 | Mergener | ................ | B25F 5/001 173/20 |
| 2013/0327552 | A1* | 12/2013 | Lovelass | ................... | B25F 5/00 173/1 |
| 2013/0331994 | A1* | 12/2013 | Ng | ........................ | B25B 23/147 700/275 |
| 2014/0284070 | A1* | 9/2014 | Ng | ............................ | B25F 5/00 173/2 |

* cited by examiner

POWER TOOL AND CONTROLLER

CROSS-REFERENCE TO RELATED APPLICATIONS

This application is based upon and claims the benefit of priority from prior Japanese Patent Application No. 2014-251774, filed on Dec. 12, 2014, the entire contents of which are incorporated herein by reference.

FIELD

This disclosure relates to a power tool and a controller thereof.

BACKGROUND

Various types of power tools such as a drill driver and an impact driver include a motor capable of generating forward rotation and reverse rotation as a drive source (e.g., refer to Japanese Laid-Open Patent Publication No. 2012-76179). A power tool includes a housing, which accommodates a motor. Rotational drive force is transmitted from the motor to an output shaft to rotate a bit, which is attached to an attachment portion coupled to the output shaft. The power tool includes a forward-reverse switch, which switches the rotation direction of the bit, that is, the rotation direction of a motor shaft. The rotation direction of the bit may be manually switched . . . .

In the power tool, various bits may be attached to the attachment portion. For example, a tap (point tap) may be used as the bit to perform threading (tapping).

SUMMARY

When a tap is used as the tip of a power tool to perform tapping and the tap is continuously rotated forward to form a thread, the removal of chips may be difficult. In this case, the chips may be removed, for example, by operating the forward-reverse switch to reverse the rotation direction of the bit. However, repetitive operation of the forward-reverse switch that switches the rotation direction of the tap to remove chips may be very burdensome to the user.

This disclosure contemplates a power tool and a controller thereof that allow a user to easily perform tapping.

The first aspect of this disclosure is a power tool. The power tool includes a motor, a drive unit driven by the motor, a trigger switch, a forward-reverse switch, and a control unit. The trigger switch is operable by a user and switchable between an activation state, in which the motor is driven, and a deactivation state, in which the motor is stopped. The forward-reverse switch is operable by the user and used to switch a motor rotation direction between a forward rotation direction and a reverse rotation direction. The control unit drives the motor based on an operation of the trigger switch. The control unit is adapted to allow an operation mode of the power tool to be switched between a first mode and a second mode. In the first mode, the control unit switches the motor rotation direction to a rotation direction that is selected by the forward-reverse switch. In the second mode, when the trigger switch is switched from the activation state to the deactivation state, the control unit switches the motor rotation direction so that the motor is driven in a rotation direction opposite to the present rotation direction when the trigger switch is activated next.

The second aspect of this disclosure is a controller that controls a power tool. The controller includes a control unit that has the same features as the first aspect described above.

The power tool and the controller of this disclosure allow a user to easily perform tapping.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a power tool 10 will now be described with reference to the drawings.

Figure 1:
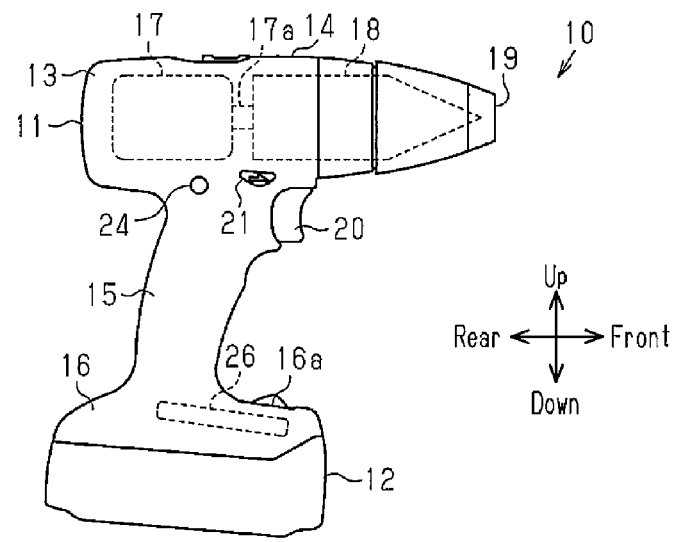
FIG. 1 is a schematic diagram illustrating one embodiment of a power tool.
Figure 2:
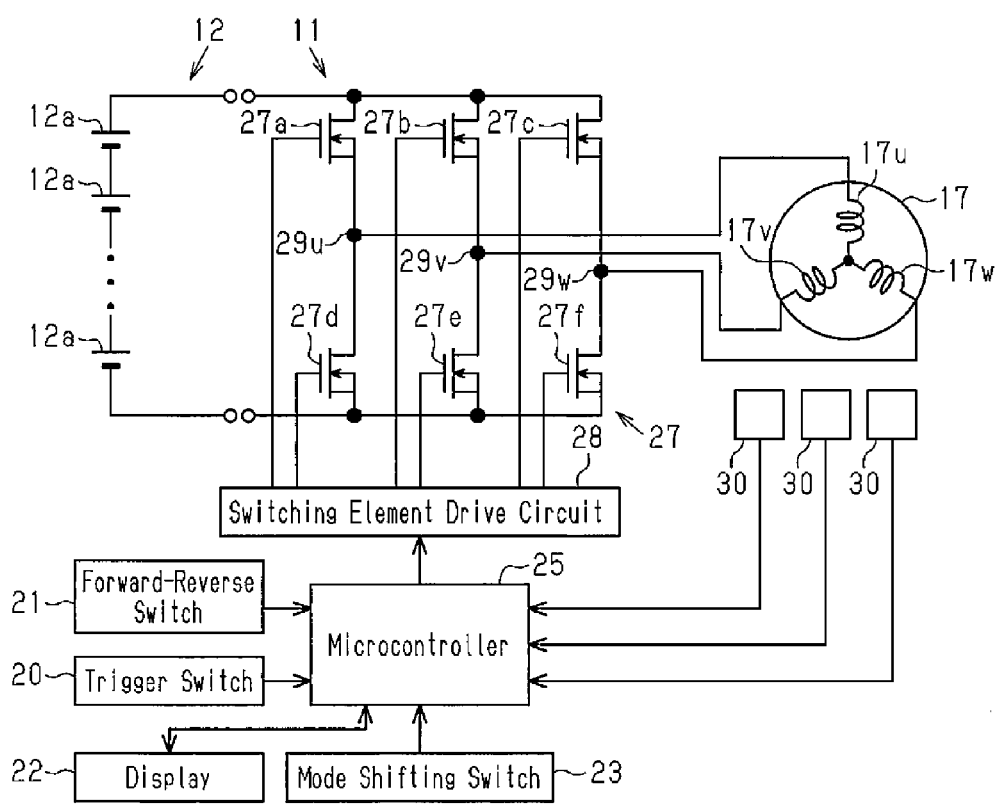
FIG. 2 is a schematic block diagram illustrating a drive control system of the power tool.

Referring to in FIG. 1, the power tool 10 includes a power tool body 11 and a battery pack 12, which is attached to the power tool body 11 in a removable manner. As illustrated in FIG. 2, the battery pack 12 incorporates a plurality of battery cells 12a.

The power tool body 11 includes a housing 13. The housing 13 includes a tubular main body 14, a handle 15, and a battery pack seat 16. The handle 15 extends downward from a longitudinally intermediate portion of the main body 14. The battery pack seat 16 is located on a lower end of the handle 15. The battery pack 12 is attachable to the battery pack seat 16.

The main body 14 accommodates a motor 17, which includes a motor shaft 17a, and a drive transmission unit 18, which functions as a drive unit and is coupled to the motor shaft 17a. The drive transmission unit 18 is driven by the motor 17 and transmits rotational drive force of the motor 17 to an output shaft (not illustrated) arranged in the drive transmission unit 18. The drive transmission unit 18 includes, for example, a speed reduction mechanism, a clutch mechanism, and the like.

The output shaft of the drive transmission unit 18 is coupled to a bit seat 19. Thus, when the motor shaft 17a rotates, the bit seat 19 is rotated by the output shaft of the drive transmission unit 18. A bit such as a driver bit or a tap may be attached to the bit seat 19 in a removable manner. Thus, the bit is rotated together with the bit seat 19. Hereafter, an axial direction of the motor shaft 17a (longitudinal direction of main body 14) is referred to as the front-rear direction of the power tool 10, and a direction in which the handle 15 extends is referred to as the vertical direction. Additionally, a width-wise direction of the power tool 10, which is orthogonal to the front-rear direction and the vertical direction, is referred to as the lateral direction.

The handle 15 of the power tool body 11 includes an upper end, which is provided with a trigger switch 20. The trigger switch 20 is operable by an operator (user). The trigger switch 20, which is used to switch activation and deactivation of the power tool 10, may be switched between an activation state, in which the motor 17 is driven, and a deactivation state, in which the motor 17 is stopped. In the activation state, the operator pulls (presses) the trigger switch 20. In the deactivation state, the operator does not operate the trigger switch 20.

A forward-reverse switch 21 is arranged proximate to the trigger switch 20. The forward-reverse switch 21 functions as a forward-reverse switch, which is used to switch the rotation direction of the bit, that is, a motor rotation direction (rotation direction of motor shaft 17a) between a forward rotation direction and a reverse rotation direction. The forward-reverse switch 21, which is operable by the operator (user), outputs rotation setting information indicating the motor rotation direction. The forward-reverse switch 21 may include, for example, an operation knob, which projects from a surface of the handle 15. In this case, when the operator shifts the operation knob between a forward rotation position and a reverse rotation position, the forward-reverse switch 21 outputs the rotation setting information indicating one of the forward rotation direction and the reverse rotation direction in accordance with the position of the operation knob.

The battery pack seat 16 is box-shaped and elongated in the front-rear direction. The battery pack seat 16 includes a front side that includes an upper surface 16a. The upper surface 16a of the battery pack seat 16 is provided with a display 22 and a mode shifting switch 23, which functions as a mode selector (refer to FIG. 2).

Figure 3:
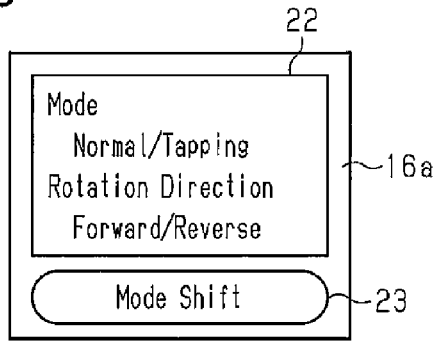
FIG. 3 is an illustrative diagram illustrating an example of a display and a mode shifting switch of the power tool.

As illustrated in FIG. 3, the display 22 may show, for example, the operation mode (one of tapping mode and normal mode) and the rotation direction of the motor 17.

The mode shifting switch 23 is used to shift the operation state of the power tool 10 between the tapping mode and the normal mode. One example of the mode shifting switch 23 is an ON/OFF switch. In this case, when the mode shifting switch 23 is switched on, the tapping mode becomes effective, and the display 22 indicates that the power tool 10 is in the tapping mode. When the mode shifting switch 23 is switched off, the normal mode is becomes effective, and the display 22 indicates that the power tool 10 is in the normal mode.

The battery pack seat 16 accommodates a control circuit 26, which includes a microcontroller 25 (control unit). The control circuit 26 corresponds to a controller.

As illustrated in FIG. 2, the microcontroller 25 is electrically connected to the trigger switch 20, the forward-reverse switch 21, the display 22, and the mode shifting switch 23. Additionally, the microcontroller 25 is electrically connected to a switching element drive circuit 28, which controls the driving of a PWM inverter circuit 27.

The switching element drive circuit 28 is connected to switching elements 27a to 27f of the PWM inverter circuit 27. The switching elements 27a to 27f each include, for example, an FET. The switching element drive circuit 28 is connected to the gate terminals of the switching elements 27a to 27f.

The switching elements 27a, 27d form a first series circuit. In the same manner, the switching elements 27b, 27e form a second series circuit, and the switching elements 27c, 27f form a third series circuit. The first to third series circuits are connected in parallel. The upper switches of the first to third series circuits, namely, the switching elements 27a, 27b, 27c, are connected to the positive terminal of the battery pack 12. The lower switches of the first to third series circuits, namely, the switching elements 27d, 27e, 27f, are connected to the negative terminal of the battery pack 12. Additionally, a connection point 29u between the switching elements 27a, 27d, a connection point 29v between the switching elements 27b, 27e, and a connection point 29w between the switching elements 27c, 27f are respectively connected to motor coils 17u, 17v, 17w of the motor 17.

Additionally, the microcontroller 25 is connected to a plurality of rotational position detection elements 30, which detects a rotational position of a rotor (not illustrated) of the motor 17. In the present embodiment, three rotational position detection elements 30 are arranged in a circumferential direction of the motor 17 at intervals of approximately 120 degrees. Here, FIG. 2 does not specifically illustrate the positions of the detection elements 30. The microcontroller 25 may detect the rotational position of the rotor of the motor 17 and whether or not the rotor of the motor 17 is rotating based on detection results of the detection elements 30.

An example of the operation of the power tool 10 of the present embodiment will now be described.

In the power tool 10, the mode shifting switch 23 may shift the operation mode. In the present embodiment, when the mode shifting switch 23 is in an OFF state, the power tool 10 operates in the normal mode, and when the mode shifting switch 23 is in an ON state, the power tool 10 operates in the tapping mode. Here, the normal mode corresponds to a first mode, and the tapping mode corresponds to a second mode.

Normal Mode

The normal mode will now be described.

Figure 4:
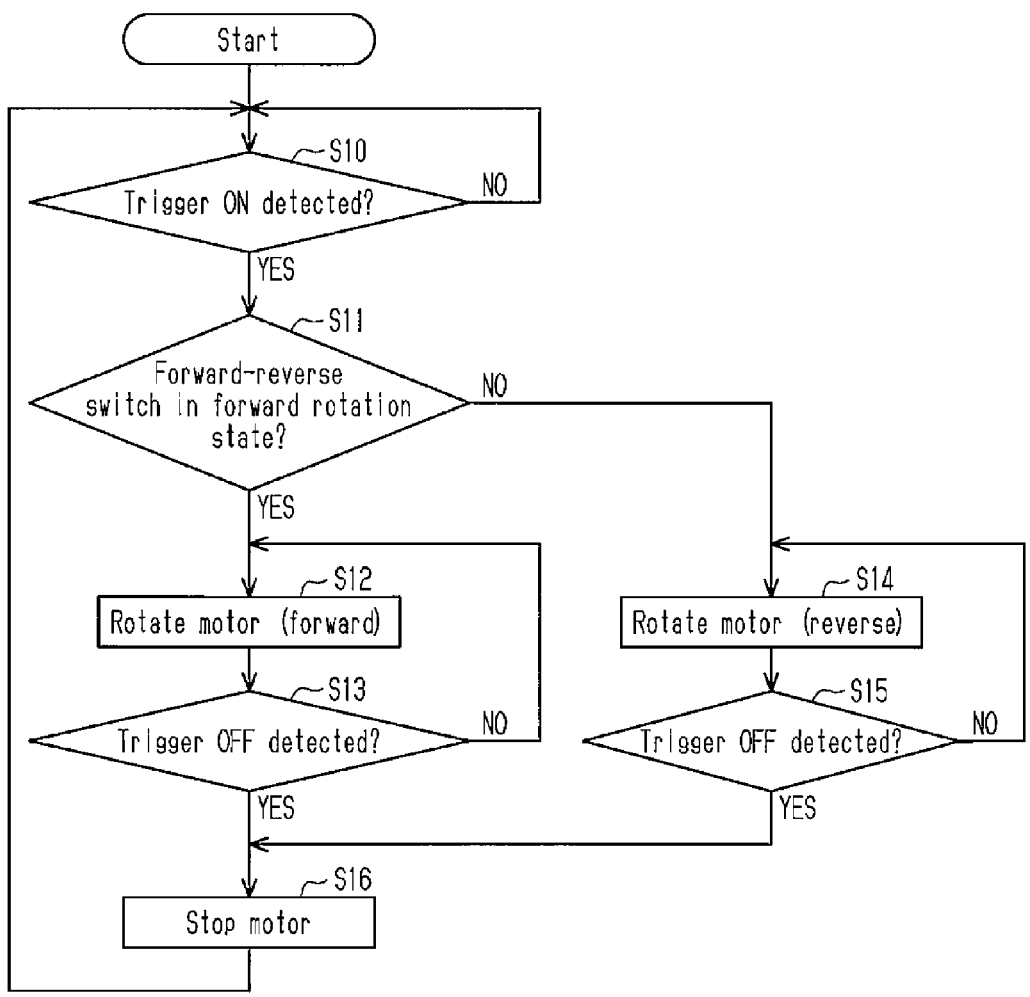
FIG. 4 is a schematic flowchart illustrating an example of the operation of the power tool in a normal mode.

As illustrated in FIG. 4, the microcontroller 25 determines whether or not the trigger switch 20 is in the activation state (step S10). When the trigger switch 20 is in the activation state (step S10: YES), the microcontroller 25 determines whether or not the forward-reverse switch 21 is in a forward rotation state, or the forward-reverse switch 21 is set to a forward rotation direction (step S11).

When the forward-reverse switch 21 is in the forward rotation state (step S11: YES), the microcontroller 25 energizes the motor 17 to drive the motor 17 in the forward rotation (step S12). At this time, the microcontroller 25 may change the rotational speed of the motor 17, for example, in accordance with an operation amount (pulled amount) of the trigger switch 20. For example, the microcontroller 25 may adjust the amount of electric current supplied from the inverter circuit 27 to the motor 17 by controlling the switching element drive circuit 28 so that the rotational speed of the motor 17 increases as the pulled amount of the trigger switch 20 becomes greater.

Then, the microcontroller 25 determines whether or not the trigger switch 20 is in the deactivation state (step S13). When the trigger switch 20 is in the activation state (step S13: NO), the microcontroller 25 repeats step S12. More specifically, when the trigger switch 20 continues to be in the activation state, the microcontroller 25 continuously drives the motor 17 and produces the forward rotation.

When the trigger switch 20 is in the deactivation state (step S13: YES), the microcontroller 25 stops energizing the motor 17 to stop the motor 17 (step S16).

On the other hand, when the forward-reverse switch 21 is in a reverse rotation state (step S11: NO), the microcontroller 25 energizes the motor 17 to drive the motor 17 and produce the reverse rotation (step S14). At this time, the microcontroller 25 may change the rotational speed of the motor 17, for example, in accordance with the operation amount (pulled amount) of the trigger switch 20. For example, the microcontroller 25 may adjust the amount of electric current supplied from the inverter circuit 27 to the motor 17 by controlling the switching element drive circuit 28 so that the rotational speed of the motor 17 increases as the pulled amount of the trigger switch 20 becomes greater.

Then, the microcontroller 25 determines whether or not the trigger switch 20 is in the deactivation state (step S15). When the trigger switch 20 is in the activation state (step S15: NO), the microcontroller 25 repeats step S14. More specifically, when the trigger switch 20 continues to be in the activation state, the microcontroller 25 continuously drives the motor 17 and produces a reverse rotation.

When the trigger switch 20 is in the deactivation state (step S15: YES), the microcontroller 25 stops energizing the motor 17 to stop the motor 17 (step S16).

As described above, when the power tool 10 is in the normal mode, the microcontroller 25 switches the motor rotation direction to the rotation direction that is selected by the operator (user) with the forward-reverse switch 21. In the normal mode, the display 22 shows the current motor rotation direction, which is selected by the forward-reverse switch 21.

Tapping Mode

The tapping mode will now be described. In the present embodiment, when the power tool 10 is initially started in the tapping mode, an initial rotation direction of the motor 17 is set, for example, to the forward rotation direction. However, there is no limit to this configuration.

Figure 5:
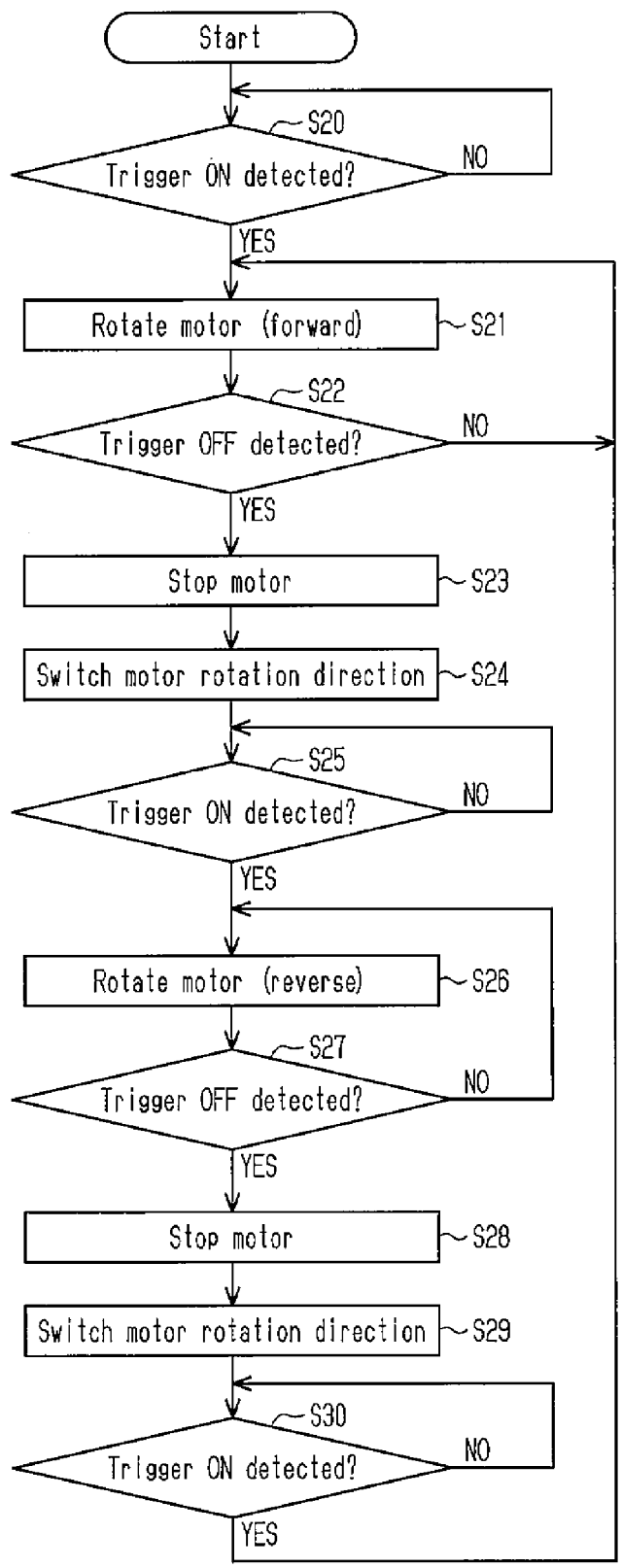
FIG. 5 is a schematic flowchart illustrating an example of the operation of the power tool in a tapping mode.

As illustrated in FIG. 5, the microcontroller 25 determines whether or not the trigger switch 20 is in the activation state (step S20). When the trigger switch 20 is in the activation state (step S20: YES), the microcontroller 25 energizes the motor 17 to drive the motor 17 and produce the forward rotation (step S21).

Then, the microcontroller 25 determines whether or not the trigger switch 20 is in the deactivation state (step S22). When the trigger switch 20 is in the activation state (step S22: NO), the microcontroller 25 repeats step S21. More specifically, when the trigger switch 20 continues to be in the activation state, the microcontroller 25 continuously drives the motor 17 and produces the forward rotation.

When the trigger switch 20 is in the deactivation state (step S22: YES), the microcontroller 25 stops energizing the motor 17 to stop the motor 17 (step S23).

Then, the microcontroller 25 sets the motor rotation direction to the reverse rotation direction (step S24). More specifically, when the trigger switch 20 is switched from the activation state to the deactivation state, the microcontroller 25 automatically switches the motor rotation direction from the forward rotation direction to the reverse rotation direction. For example, the microcontroller 25 rewrites the rotation setting information, which is stored in a memory or a register arranged in the microcontroller 25.

Then, the microcontroller 25 determines whether or not the trigger switch 20 is in the activation state (step S25). When the trigger switch 20 is in the activation state (step S25: YES), the microcontroller 25 energizes the motor 17 so that the motor 17 is driven in the motor rotation direction that is set in step S24, or the reverse rotation direction (step S26).

Subsequently, the microcontroller 25 determines whether or not the trigger switch 20 is in the deactivation state (step S27). When the trigger switch 20 is in the activation state (step S27: NO), the microcontroller 25 repeats step S26. More specifically, when the trigger switch 20 continues to be in the activation state, the microcontroller 25 continuously drives the motor 17 and produces the reverse rotation.

When the trigger switch 20 is in the deactivation state (step S27: YES), the microcontroller 25 stops energizing the motor 17 to stop the motor 17 (step S28).

Then, the microcontroller 25 sets the motor rotation direction to the forward rotation direction (step S29). More specifically, when the trigger switch 20 is switched from the activation state to the deactivation state, the microcontroller 25 automatically switches the motor rotation direction from the reverse rotation direction to the forward rotation direction.

Then, the microcontroller 25 determines whether or not the trigger switch 20 is in the activation state (step S30). When the trigger switch 20 is in the activation state (step S30: YES), the microcontroller 25 proceeds to step S21 and energizes the motor 17 so that the motor 17 is driven in the motor rotation direction that is set in step S29, or the forward rotation direction. Subsequently, the microcontroller 25 repeats steps S22 to S30.

As described above, when the power tool 10 is in the tapping mode and the trigger switch 20 is switched from the activation state to the deactivation state, the microcontroller 25 automatically switches the motor rotation direction to one that is set for the next operation. In the tapping mode, the display 22 shows whether the next motor rotation direction is the forward rotation direction or the reverse rotation direction. For example, in step S21, when the motor 17 is driven to produce the forward rotation, the display 22 shows that the next motor rotation direction is the reverse rotation direction. Subsequently, when the motor 17 is driven to produce the reverse rotation, the display 22 shows that the next motor rotation direction is the forward rotation direction. This allows the operator to recognize the next motor rotation direction and further accurately perform tapping. Here, in the tapping mode, the display 22 may show the current motor rotation direction together with the next motor rotation direction.

The present embodiment has the advantages described below.

(1) The microcontroller 25 may shift the operation state of the power tool 10 between the normal mode and the tapping mode. When the power tool 10 is in the normal mode, the microcontroller 25 switches the motor rotation direction to the rotation direction that is selected by the forward-reverse switch 21. When the power tool 10 is in the tapping mode and the trigger switch 20 is switched from the activation state to the deactivation state, the microcontroller 25 switches the motor rotation direction to the rotation direction that is set when the trigger switch 20 is activated next. In this manner, during the tapping mode, the microcontroller 25 automatically switches the driving of the motor 17 between the forward rotation and the reverse rotation in response to the switching of the trigger switch 20 from the activation state to the deactivation state instead of an output of the forward-reverse switch 21. Thus, the operator (user) does not have to operate the forward-reverse switch 21 during tapping. This reduces the burden to the operator. Additionally, the position of a contact point of the forward-reverse switch 21 does not have to be shifted between the forward rotation position and the reverse rotation position. This reduces wear of the contact point of the forward-reverse switch 21.

(2) The power tool 10 includes the mode shifting switch 23, which shifts the operation mode between the normal mode and the tapping mode, and the display 22, which shows the operation mode selected by the mode shifting switch 23. This allows a user to check whether the current operation mode is the tapping mode or the normal mode with the display 22 when shifting the operation mode.

(3) In the tapping mode, the display 22 shows whether the next motor rotation direction is the forward rotation direction or the reverse rotation direction. This allows a user to recognize the next motor rotation direction with the display 22 and further accurately perform tapping.

(4) When the trigger switch 20 is initially activated in the tapping mode, the microcontroller 25 drives the motor 17 and produces the forward rotation. That is, in the tapping mode, the initial rotation direction of the motor 17 is set to the forward rotation direction. This reduces operation errors.

(5) In the tapping mode, the microcontroller 25 switches the rotation direction of the motor 17 after the motor 17 completely stops. This limits damage on the switching elements 27a to 27f, which switch the driving of the motor 17 between the forward rotation and the reverse rotation.

It should be apparent to those skilled in the art that the present invention may be embodied in many other specific forms without departing from the scope of the invention. Particularly, it should be understood that the present invention may be embodied in the following forms.

In the above embodiment, in the tapping mode, the initial rotation direction of the motor 17 is set to the forward rotation direction. Instead, for example, in the tapping mode, the initial rotation direction of the motor 17 may be set to the reverse rotation direction. Additionally, the microcontroller 25 may store the motor rotation direction when the tapping mode is ended. When the next tapping mode is started, the microcontroller 25 may start driving the motor 17 in the stored motor rotation direction. Alternatively, the current state of the forward-reverse switch 21 may be set to the initial rotation direction of the motor 17 in the tapping mode.

In the above embodiment, subsequent to step S30, step S21 to step S30 are repeated. However, the flowchart in FIG. 5 may be modified as long as the equivalent process is performed. For example, step S30 may be omitted. In this case, step S20 to step S29 may be repeated subsequent to step S29.

In the above embodiment, the mode shifting switch 23 is arranged on the upper surface 16a of the battery pack seat 16, which is located at the front side. However, the position of the mode shifting switch 23 may be changed.

In the above embodiment, the display 22 is arranged on the upper surface 16a of the battery pack seat 16, which is located at the front side. However, the position of the display 22 may be changed. Alternatively, the display 22 may be omitted. Further, the operation mode and the motor rotation direction may be notified to a user using a means other than a display, such as a sound, a buzzer, vibration, or the like.

Although not particularly described in the above embodiment, the power tool 10 may include, for example, a rotational speed setting unit 24 that is operable by a use and capable of setting the rotational speed of the motor 17 in the tapping mode. In this case, the microcontroller 25 may control the motor 17 so that the motor 17 is driven at the rotational speed that is set by the rotational speed setting unit 24. In such a configuration, the maximum rotational speed of the tapping mode may be set to a desired rotational speed. This improves the efficiency of the operation performed by a user. Additionally, the maximum rotational speed may be limited. This reduces damage of the bit (tap).

The above embodiment and modified examples may be combined.

This disclosure encompasses various embodiments described below.

1. A power tool including:
a motor;
a drive unit driven by the motor;
a trigger switch operable by a user and switchable between an activation state, in which the motor is driven, and a deactivation state, in which the motor is stopped;
a forward-reverse switch operable by the user and used to switch a motor rotation direction between a forward rotation direction and a reverse rotation direction; and
a control unit that drives the motor based on an operation of the trigger switch, wherein
the control unit is adapted to allow an operation mode of the power tool to be switched between a first mode and a second mode, wherein
in the first mode, the control unit switches the motor rotation direction to a rotation direction that is selected by the forward-reverse switch, and
in the second mode, when the trigger switch is switched from the activation state to the deactivation state, the control unit switches the motor rotation direction so that the motor is driven in a rotation direction opposite to the present rotation direction when the trigger switch is activated next.

2. The power tool according to clause 1, further including:
a mode selector used to switch the operation mode of the power tool between the first mode and the second mode; and
a display that shows one of the first mode and the second mode that is selected by the mode selector.

3. The power tool according to clause 2, wherein in the second mode, the display shows a next motor rotation direction when the motor is driven.

4. The power tool according to any one of clauses 1 to 3, further including:
a rotational speed setting unit operable by the user and adapted to allow a rotational speed of the motor to be set in the second mode, wherein
the control unit controls the motor so that the motor is driven at the rotational speed that is set by the rotational speed setting unit.

5. The power tool according to any one of clauses 1 to 4, wherein the control unit controls the motor so that the motor is driven in a forward rotation when the trigger switch is initially activated in the second mode.

6. The power tool according to any one of clauses 1 to 5, wherein the control unit controls the motor so that, in the second mode, the motor rotation direction is switched after the motor completely stops.

7. A controller that controls a power tool, wherein the power tool includes a motor, a drive unit driven by the motor, a trigger switch operable by a user and switchable between an activation state, in which the motor is driven, and a deactivation state, in which the motor is stopped, and a forward-reverse switch operable by the user and used to switch a motor rotation direction between a forward rotation direction and a reverse rotation direction, the controller including:
a control unit that drives the motor based on an operation of the trigger switch, wherein
the control unit is adapted to allow an operation state of the power tool to be switched between a first mode and a second mode, wherein in the first mode, the control unit switches the motor rotation direction to a rotation direction that is selected by the forward-reverse switch, and in the second mode, when the trigger switch is switched from the activation state to the deactivation state, the control unit switches the motor rotation direction so that the motor is driven in a rotation direction opposite to the present rotation direction when the trigger switch is activated next.

The present examples and embodiments are to be considered as illustrative and not restrictive, and the invention is not to be limited to the details given herein, but may be modified within the scope and equivalence of the appended claims.

The invention claimed is:

1. A power tool comprising:
a motor;
a drive unit driven by the motor;
a trigger switch operable by a user and switchable between an activation state, in which the motor is driven, and a deactivation state, in which the motor is stopped;
a forward-reverse switch operable by the user and used to switch a motor rotation direction between a forward rotation direction and a reverse rotation direction; and
a control unit that drives the motor based on an operation of the trigger switch, wherein
the control unit is adapted to allow a mode shifting switch of the power tool to be switched between a first mode and a second mode; wherein
in the first mode, the control unit switches the motor rotation direction to a rotation direction that is selected by the forward-reverse switch,
in the second mode, when the trigger switch is switched from the activation state to the deactivation state, the control unit switches the motor rotation direction so that the motor is driven in a rotation direction opposite to the present rotation direction when the trigger switch is activated next, and
in the second mode, when the trigger switch continues to be in the activation state, the control unit continuously drives the motor in the present rotation direction.

2. The power tool according to claim 1, wherein
the mode shifting switch is operable to select one of the first mode and the second mode, the power tool further comprising
a display that shows one of the first mode and the second mode that is selected by the mode shifting switch.

3. The power tool according to claim 2, wherein in the second mode, the display shows a next motor rotation direction when the motor is driven.

4. The power tool according to claim 1, further comprising:
a rotational speed setting unit operable by the user and adapted to allow a rotational speed of the motor to be set in the second mode, wherein
the control unit controls the motor so that the motor is driven at the rotational speed that is set by the rotational speed setting unit.

5. The power tool according to claim 1, wherein the control unit controls the motor so that the motor is driven in a forward rotation when the trigger switch is initially activated in the second mode.

6. The power tool according to claim 1, wherein the control unit controls the motor so that, in the second mode, the motor rotation direction is switched after the motor completely stops.

7. A controller that controls a power tool, wherein the power tool includes a motor, a drive unit driven by the motor, a trigger switch operable by a user and switchable between an activation state, in which the motor is driven, and a deactivation state, in which the motor is stopped, and a forward-reverse switch operable by the user and used to switch a motor rotation direction between a forward rotation direction and a reverse rotation direction, the controller comprising:
a control unit that drives the motor based on an operation of the trigger switch, wherein
the control unit is adapted to allow a mode shifting switch of the power tool to be switched between a first mode and a second mode, wherein
in the first mode, the control unit switches the motor rotation direction to a rotation direction that is selected by the forward-reverse switch,
in the second mode, when the trigger switch is switched from the activation state to the deactivation state, the control unit switches the motor rotation direction so that the motor is driven in a rotation direction opposite to the present rotation direction when the trigger switch is activated next, and
in the second mode, when the trigger switch continues to be in the activation state, the control unit continuously drives the motor in the present rotation direction.

* * * * *